United States Patent
Beteille et al.

(10) Patent No.: US 7,193,763 B2
(45) Date of Patent: Mar. 20, 2007

(54) ELECTROCHEMICAL/ELECTROCONTROLLABLE DEVICE ELECTRODE

(75) Inventors: Fabien Beteille, Paris (FR); Xavier Fanton, Aulnay-sous-Bois (FR); Jean-Christophe Giron, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 64 days.

(21) Appl. No.: 10/495,758

(22) PCT Filed: Dec. 4, 2002

(86) PCT No.: PCT/FR02/04172

§ 371 (c)(1),
(2), (4) Date: Sep. 28, 2004

(87) PCT Pub. No.: WO03/048843

PCT Pub. Date: Jun. 12, 2003

(65) Prior Publication Data

US 2005/0041276 A1 Feb. 24, 2005

(30) Foreign Application Priority Data

Dec. 5, 2001 (FR) .................................. 01 15687

(51) Int. Cl.
G02F 1/15 (2006.01)

(52) U.S. Cl. ..................................... 359/265

(58) Field of Classification Search ................ 359/265, 359/266, 267, 268, 269, 270, 271, 272, 273, 359/274, 275, 245; 429/33, 192, 304
See application file for complete search history.

(56) References Cited

U.S. PATENT DOCUMENTS

| | | | | |
|---|---|---|---|---|
| 5,202,788 A | | 4/1993 | Weppner | |
| 5,663,829 A | * | 9/1997 | Lefrou et al. | 359/275 |
| 5,985,486 A | * | 11/1999 | Giron | 429/188 |
| 6,094,292 A | * | 7/2000 | Goldner et al. | 359/265 |
| 6,277,523 B1 | | 8/2001 | Giron | |
| 6,631,022 B1 | * | 10/2003 | Kihira et al. | 359/265 |
| 2002/0054419 A1 | * | 5/2002 | Beteille et al. | 359/273 |
| 2005/0041276 A1 | | 2/2005 | Beteille et al. | |

OTHER PUBLICATIONS

K. L. Chopra, et al., "Transparent conductors-a status review", Thin Solid Films, vol. 102, pp. 1-46 1983.
U.S. Appl. No. 10/563,322, filed Jan. 4, 2006, Giron et al.
U.S. Appl. No. 10/564,501, filed Jan. 13, 2006, Giron et al.

* cited by examiner

Primary Examiner—Hang X. Dang
Assistant Examiner—Tuyen Tra
(74) Attorney, Agent, or Firm—Oblon, Spivak, McClelland, Maier & Neustadt, P.C.

(57) ABSTRACT

An electrochemical/electrically controllable device including at least one carrier substrate provided with an electroactive layer or a stack of electroactive layers placed between a lower electrode and an upper electrode. The upper electrode includes at least one electronically conductive layer, especially a transparent one, based on doped indium oxide or on doped tin oxide or on doped zinc oxide, which is at least partially crystallized in the form of crystallites having a mean size of between 5 and 100 nm, especially between 10 and 50 nm.

26 Claims, 2 Drawing Sheets

Figure 1:
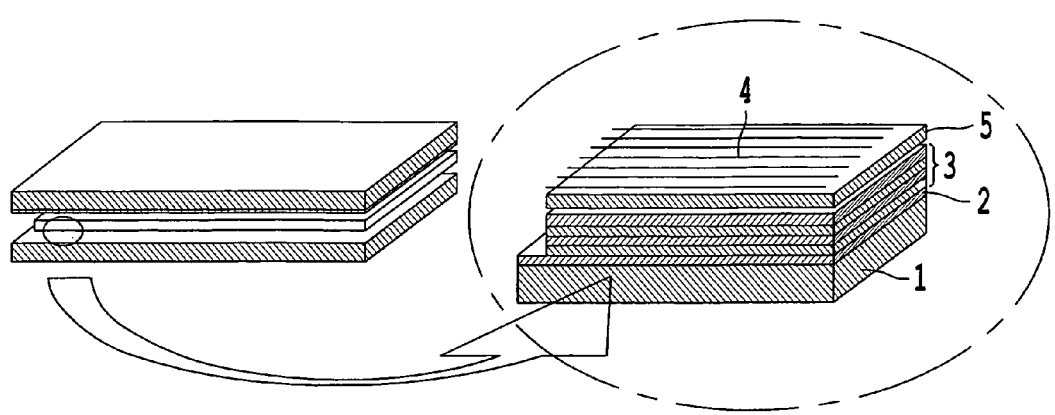

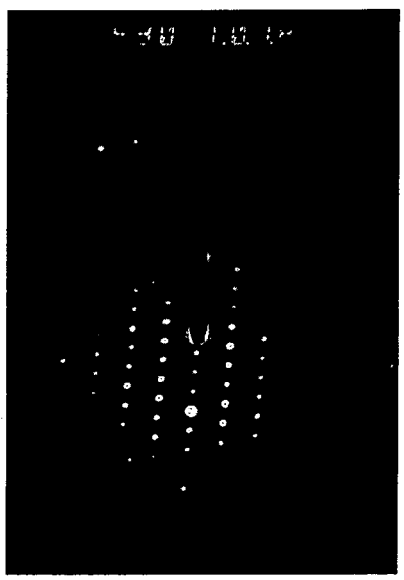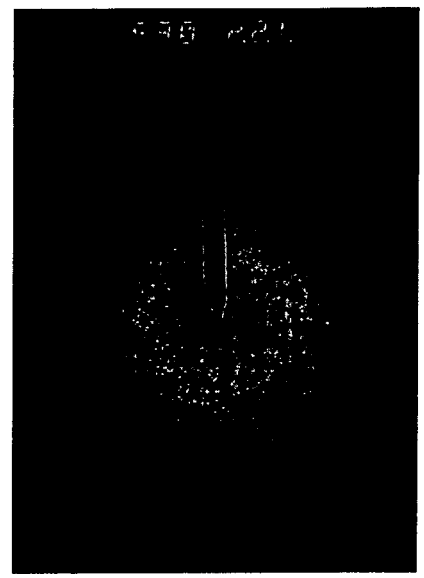
FIG.3a          FIG.3b

ELECTROCHEMICAL/ELECTROCONTROLLABLE DEVICE ELECTRODE

CROSS-REFERENCE TO RELATED APPLICATIONS

The present application is the U.S. counterpart of WO 03/048,843, and claims priority to French application no. 01/15687 filed on Dec. 5, 2001, the entire contents of each of which are hereby incorporated herein by reference.

The subject of the present invention is an electrochemical and/or electrically controllable device of the glazing type and having variable optical and/or energy properties, or a photovoltaic device or else an electroluminescent device.

At the present time there is in fact an increasing demand for so-called "smart" glazing capable of meeting the requirements of users.

There is also an increasing demand for photovoltaic glazing, which makes it possible to convert solar energy into electrical energy, and for electroluminescent glazing, which has useful applications in devices and as eluminating surfaces.

As regards "smart" glazing, this makes it possible to control the solar heat influx through glazing panels fitted on the outside of buildings, or vehicles of the car, train or plane type. The object is to be able to limit excessive heating inside passenger compartments/rooms, but only should there be strong sunlight.

This may also control the degree of vision through glazing panels, especially in order to darken them, or to make them diffusing or even to prevent any vision when this is desirable. This may relate to glazing panels fitted into internal partitions in rooms, trains or aircraft, or fitted as side windows in motor vehicles. This also relates to mirrors used as rear-view mirrors, to prevent drivers from being dazzled, or road signs so that messages appear when necessary, or intermittently in order to draw the attention better. Glazing panels that can be made diffusing at will may be used, when so desired, as projection screens.

There are various electrically controllable systems allowing this kind of modification in appearance/thermal properties.

To modulate the light transmission or the light absorption of glazing, there are viologen-based systems such as those disclosed in the U.S. Pat. No. 5,239,406 and EP-612 826.

To modulate the light transmission and/or the thermal transmission of glazing panels, there are also electrochromic systems. As is known, these generally comprise two layers of electrochromic material which are separated by an electrolyte layer and flanked by two electronically conductive layers. Each of the layers of electrochromic material can inject/eject cations and electrons, the change in their degree of oxidation following such injection/ejection resulting in a change in its optical and/or thermal properties. In particular, it is possible to modulate their absorption and/or their reflection for wavelengths in the visible or in the solar spectrum.

It is customary to put electrochromic systems into three categories:

that in which the electrolyte is in the form of a polymer or a gel; for example, a protonically conductive polymer such as those disclosed in patents EP-253 713 or EP-670 346, or a polymer conducting by lithium ions, such as those disclosed in patents EP-382 623, EP-518 754 and EP-532 408; the other layers of the system generally being inorganic in nature;

that in which the electrolyte is an essentially inorganic layer. This category is often referred to as an "all solid state" system—examples of this may be found in the patents EP-867 752 and EP-831 360 and the patents WO 00/57243 and WO 00/71777; and that in which all of the layers are based on polymers, this category being often referred to as an "all polymer" system.

There are also systems called "optical valves". These are films comprising a matrix of a generally crosslinked polymer, in which microdroplets containing particles are dispersed, which particles are capable of being oriented in a preferred direction under the action of a magnetic or electric field. Thus, the patent WO 93/09460 discloses an optical valve comprising a polyorganosilane matrix and polyiodide-type particles which intercept much less light when the film is under voltage.

Mention may also be made of liquid-crystal systems, operating in a similar mode to the previous ones. They are based on the use of a film placed between two conductive layers and based on a polymer in which liquid-crystal droplets are placed, especially nematic liquid crystals of positive dielectric anisotropy. When a voltage is applied to the film, the liquid crystals orient along a preferred axis, which permits vision. With no voltage applied, when the crystals are not aligned, the film becomes scattered and prevents vision. Examples of such films are disclosed in particular in European patent EP-0 238 164 and U.S. Pat. No. 4,435,047, U.S. Pat. No. 4,806,922 and U.S. Pat. No. 4,732,456. This type of film, once it has been laminated and incorporated between two glass substrates, is sold by Saint-Gobain Vitrage under the brand name "Priva-Lite".

In fact, it is possible to use any of the liquid-crystal devices known by the term NCAP (Nematic Curvilinearly Aligned Phase) or the term PDLC (Polymer Dispersed Liquid Crystal).

It is also possible to use, for example, cholesteric liquid-crystal polymers such as those disclosed in the patent WO 92/19695.

As regards electroluminescent systems, these include a phosphor material supplied with electricity via electrodes.

All these confounded systems have in common the need to be equipped with current leads for supplying electrodes generally in the form of two electronically conductive layers on either side of the active layer or of the various active layers of the system.

These electronically conductive layers (which may in fact be a superposition of layers) commonly include a layer based on indium oxide, generally tin-doped indium oxide known by the abbreviation ITO. There may also be layers based on doped tin oxide, for example antimony-doped tin oxide, or else layers based on doped zinc oxide, for example aluminum-doped zinc oxide (or a mixture based on at least two of these oxides).

These layers are sufficiently conductive and can be easily deposited by magnetically enhanced sputtering, either using an oxide target (nonreactive sputtering) or using a target based on indium and tin (reactive sputtering in the presence of an oxidizing agent of the oxygen type).

The objective of the invention is to be able to improve the performance of electrochemical/electrically controllable systems of the type of those (electrochromic, photovoltaic, electroluminescent, etc.) described above, and more particularly electrochromic systems, especially their optical/energy performance and their switching rate, and/or to extend their lifetime. Secondarily, this objective is to be achieved without upsetting the known configurations of electrochemical systems relating to the invention. More generally, the aim is to develop better electrodes on an essentially transparent (glass or polymer) substrate.

The subject of the invention is an electrochemical/electrically controllable device having variable optical and/or energy properties, comprising at least one carrier substrate provided with an electroactive layer or a stack of electroactive layers placed between an electrode called the "lower" electrode and an electrode called the "upper" electrode. According to the invention, the "upper" electrode comprises at least one electronically conductive layer, preferably transparent, based on doped indium oxide, especially tin-doped indium oxide, or on doped tin oxide, especially antimony-doped tin oxide, or on doped zinc oxide, especially aluminum-doped zinc oxide. Said layer is at least partially crystallized in the form of crystallites having a mean size of between 5 and 100 nm, especially at least 20 nm . The invention may in fact apply more generally to the conductive layers referred to as TCO (Transparent Conductive Oxide) layers, that is to say transparent conductive layers based on one or more metal oxides.

Within the context of the invention, the term "lower" electrode is understood to mean the electrode lying closest to the carrier substrate taken as reference, on which electrode at least some of the active layers (all of the active layers in an "all solid state" electrochromic system) are deposited. The "upper" electrode is that deposited on the other side with respect to the same reference substrate.

In the rest of the text, for the sake of brevity the layer based on indium oxide or based on tin oxide or based on zinc oxide of the upper electrode will be denoted by the term "upper ITO". By convention, this name also covers indium oxides doped by a metal other than tin.

The inventors have surprisingly discovered the influence that the crystalline structure of the upper ITO can have on all of the rest of the electroactive system. It has turned out that an at least partially crystalline structure, additionally having crystallites of nanometric size, is much more advantageous than, for example, an amorphous structure.

This "nanocrystallization" of the ITO according to the invention cannot always be detected by X-ray diffraction. If it cannot be detected by X-rays, other analytical techniques may be used. These include, in particular, TEM (Transmission Electron Microscopy), or the technique called SAED (Selective Area Electron Diffraction).

In fact, this particular crystallization is beneficial with regard to the stability of the entire electrochemical system: the upper electrode is frequently deposited on top of all of the other layers of the electroactive system by, for example, a vacuum technique of the sputtering type. Consequently, the tendency is therefore to give preference to "cold" deposition, at room temperature, for at least two reasons:

firstly, this thus avoids taking any risk of degrading the subjacent layers; and secondly, satisfactory levels of electrical conductivity are obtained "cold".

Layers of the amorphous type are therefore generally obtained. However, the inventors have shown that it is necessary to take into account not only the electrical conductivity of the layer but also its electrochemical stability. Furthermore, upper ITO layers of the amorphous type would, without realizing it, be the cause of premature instability and aging of certain electrochemical systems.

In contrast, if the upper ITO layers are deposited so as to be "nanocrystallized", they are much better and much more electrochemically stable. This discovery has allowed the performance of electrochemical systems, especially in the case of electrochromic systems, to be significantly improved by increasing their lifetime. By this is meant, in particular, that the period of time until the switching rate starts to fall off can be extended. This may also make it possible to extend the period of time until the variation in light and/or energy transmission starts to have a smaller amplitude and/or until the light and/or energy transmission value in a given state starts to drift. The inventors have also noticed, with this type of upper ITO, the electrochemical systems are more temperature stable. This is a not insignificant point, especially for electrochromic glazing panels fitted as outside windows of buildings or as motor vehicle roofs, these glazing panels being liable to heat up due to the effect of sunshine and of their coloration, which makes them (at least slightly) absorbent.

Advantageously, the upper ITO according to the invention has an electrical resistivity of between $10^{-4}$ and $10^{-2}$ ohm.cm, especially one between $10^{-4}$ and $2\times10^{-3}$ ohm.cm, making its use as an electrode perfectly satisfactory.

Preferably, especially in order to achieve this level of resistivity, it has a thickness of between 40 and 400 nm, especially between 50 and 300 nm or between 120 and 280 nm. Within these thickness ranges, the ITO is transparent, that is to say it has a low light absorption in the visible. However, it is not excluded from having substantially thicker layers (especially if the electroactive system of the electrochromic type operates in reflection rather than in transmission), or thinner layers (especially when they are combined in the electrode with another type of conductive layer, for example a metallic layer).

Advantageously, the ITO contains between 3 and 20%, especially 5 and 15% and preferably about 10%, tin (or another dopant metal) with respect to indium. This percentage is expressed by weight of tin oxide (dopant oxide) with respect to indium oxide (the predominant oxide). This percentage range between dopant oxide and predominant oxide is preferably offset toward lower values when said layer is a layer based on zinc oxide oxide, especially aluminium-doped zinc oxide; in this case, a percentage by weight of $Al_2O_3$ of between 0.5 and 5%, especially 1 and 4%, with respect to ZnO is preferred. One example consists in choosing a proportion of 2% by weight of $Al_2O_3$ with respect to ZnO.

According to a variant of the invention, the lower electrode also includes an electronically conductive layer, preferably transparent and based on a conductive oxide of the same type as that of the upper electrode, such as doped indium oxide, especially tin-doped indium oxide, or doped tin oxide or doped zinc oxide, and at least partially crystallized, like that belonging to the upper electrode. It is thus possible to have two layers based on ITO or on tin oxide or on zinc oxide, one in each of the two electrodes of the electroactive system, and having the same characteristics. This has in particular the advantage of being able to deposit a succession of layers, one after the other, the first and the last (the ITO or doped tin oxide or doped zinc oxide layers) being deposited in the same way, with the same deposition parameters (especially in the same deposition chamber when this is carried out by sputtering, by making the carrier substrate pass twice beneath the same target with the same conditions/settings.

Preferably, the upper electrode according to the invention includes other conductive elements than the upper ITO: more particularly, it is possible to combine the ITO layer with a layer more conductive than the latter and/or with a plurality of conducting bands or wires. For further details, reference may be made to the aforementioned patent WO 00/57243 for the implementation of such multi-component electrodes. A preferred embodiment of this type of electrode consists in applying, to the ITO layer (optionally surmounted by one or more other conductive layers), an array of conducting wires embedded in the surface of a sheet of polymer (which may then protect the active system and/or allow the glass-type carrier substrate to be laminated to another glass in the case of the manufacture of an electroactive glazing panel, for example of the electrochromic type).

As mentioned earlier, the invention may apply to various types of electrochemical or electrically controllable systems. It is more particularly of interest in the case of electrochromic systems, especially "all solid state" or "all polymer" systems or else liquid-crystal or viologen-based systems, or electroluminescent systems.

The electrochromic systems or glazing panels to which the invention may apply are described in the aforementioned patents. They may comprise at least one carrier substrate and a stack of functional layers comprising at least, in succession, a first electronically conductive layer, an electrochemically active layer capable of injecting or ejecting ions, such as $H^+$, $Li^+$, $OH^-$ of the anodic or cathodic electrochromic material respectively, an electrolyte layer, a second electrochemically active layer capable of injecting or ejecting ions such as $H^+$, $Li^+$, $OH^-$ of the cathodic or anodic electrochromic material respectively, and a second electronically conductive layer (the term "layer" is to be understood to be a single layer or a superposition of several, continuous or discontinuous, layers).

The invention also relates to the incorporation of the electrochemical devices described in the preamble of the present application in glazing, operating in reflection (a mirror) or in transmission. The term "glazing" is to be understood in the broad sense and it encompasses any essentially transparent material, made of glass and/or polymer (such as polycarbonate PC or polymethyl methacrylate PMMA). The carrier substrates and/or superstrates, that is to say the substrates flanking the active system, may be rigid, flexible or semi-flexible.

If the glazing operates in reflection, it may especially be used as an interior mirror or as a rear-view mirror.

The invention also relates to the various applications in which these devices may be found—glazing or mirrors: they may be glazing for buildings, especially external glazing, internal partitions or glazed doors. They may also be windows, roofs or internal partitions for means of transportation such as trains, aircraft, cars, ships. They may also be display screens, such as projection screens, television or computer screens, and touch-sensitive screens. They may also be used to make spectacles or camera lenses, or to protect solar panels. They may also be used as energy storage devices of the battery or fuel-cell type, and as batteries and cells themselves.

The subject of the invention is also the process for obtaining the device described above, consisting in depositing the upper ITO by magnetically enhanced sputtering, especially at room temperature. This is because it is often chosen to deposit the ITO layer of the lower electrode hot, as this is the first layer of the stack and this generally makes it possible to obtain denser layers. However, for the upper ITO, deposition at room temperature is preferable so as to avoid having to heat the subjacent layers, which are liable to be damaged at high temperature. However, heating to moderate temperatures (30 to 220° C., especially 50 to 200° C.) is possible, or even to higher temperatures, if the subjacent layers are able to withstand these temperatures.

Advantageously, the pressure in the deposition chamber during deposition of the upper ITO is less than 1.2 Pa ($1.2\times10^{-2}$ mbar), preferably less than or equal to 1 Pa ($10^{-2}$ mbar) or less than or equal to 0.8 Pa ($8\times10^{-3}$ mbar) or less than or equal to 0.5 Pa ($5\times10^{-3}$ mbar). Advantageously, the pressure is at least 0.08 Pa ($8\times10^{-4}$ mbar): it has been shown that depositing the upper ITO layer at such low pressures makes it possible to obtain a dense nano-crystallized layer. According to the invention, there are other techniques, again using sputtering, to achieve this result; thus, it is possible to use deposition with ion assistance, to use off-equilibrium magnets and/or, as was seen above, to heat (moderately) the carrier substrate during deposition.

Advantageously, the functional layer (or the stack of functional layers) and the upper ITO (and even possibly the lower electrode) are deposited by the same deposition technique. This is especially the case for "all solid state" electrochromic systems.

Figure 2:
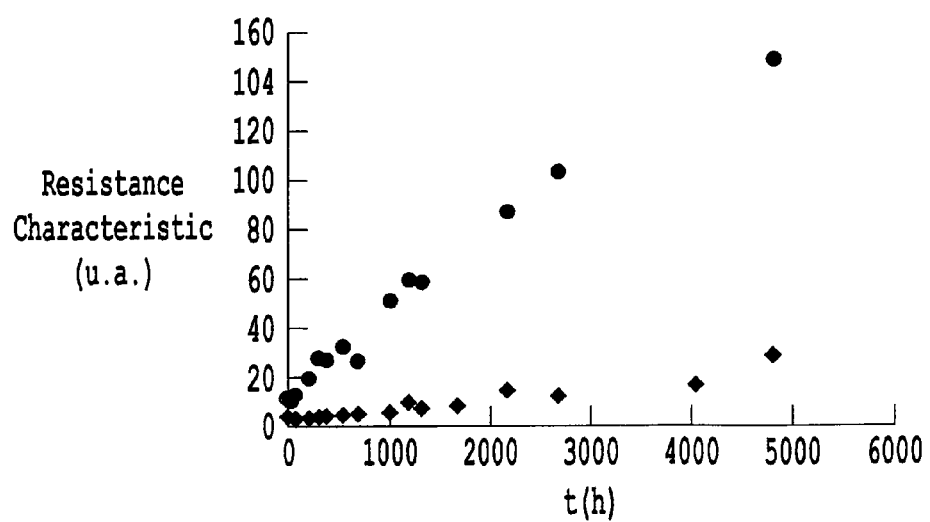

The invention will now be described in greater detail with the aid of nonlimiting examples and the figures:

FIG. 1: a schematic sectional view of an electrochromic cell using an upper ITO according to the invention;

FIG. 2: a graph comparing the aging of electrochromic cells using upper ITO layers in accordance with the invention with amorphous upper ITO layers; and FIGS. 3*a* and 3*b*: election diffraction patterns of the upper ITO according to the invention and according to a comparative example.

FIG. 1 is intentionally highly schematic and is not necessarily to scale in order to make it easier to examine: it represents, in cross section, an "all solid state" electrochromic cell comprising, in succession:

- a pane 1 of clear soda-lime silica glass 2.1 mm in thickness;
- a lower electrode 2, which is a bilayer consisting of a 30 nm $SiO_xN_y$ first layer surmounted by a 250 nm ITO (tin-doped indium oxide) second layer;
- The electroebromic system 3 comprises:
- a first layer of anodic electrochromic material consisting of 40 to 100 nm of hydrated iridium oxide or 40 to 400 nm of hydrated nickel oxide which may or may not be alloyed with other metals;
- a layer consisting of 100 nm of tungsten oxide;
- a second layer consisting of 100 nm of hydrated tantalum oxide or hydrated silica oxide or hydrated zirconium oxide;
- a second layer consisting of 370 nm of cathodic electrochromic material based on tungsten oxide $WO_3$;
- an upper electrode 4 consisting of a 270 nm ITO layer 5 and an array of conducting wires encrusted in the surface of a sheet of polyurethane PU 1.24 mm in thickness. The conducting wires are made of metal, parallel to one another and linear. Alternatively, these wires may be in a wavy pattern.

The PU sheet is used to laminate the glass pane 1 to another glass pane having the same characteristics as the glass pane 1. Optionally, that face of the glass pane facing the PU sheet is provided with a stack of thin layers having a solar protection function. This stack may include in particular, in a known manner, two silver layers sandwiched by dielectric layers.

All of the layers were deposited by magnetically enhanced sputtering. The lower ITO was deposited hot, at 300° C.

EXAMPLE 1

In this case, the ITO of the upper electrode was deposited at room temperature, the pressure in the deposition chamber being 0.4 Pa ($4 \times 10^{-3}$ mbar), using a target made of fully oxidized ITO ceramic comprising about 10% by weight $SnO_2$ with respect to $In_2O_3$. The ITO layer was analyzed by electron diffraction: the pattern in FIG. 3a clearly shows spots characteristic of nanometric-size crystallites.

EXAMPLE 2 (COMPARATIVE EXAMPLE)

In this case, the ITO of the upper electrode was deposited at room temperature, the pressure in the deposition chamber being 1.2 Pa ($1.2 \times 10^{-2}$ mbar), using the same target as that of example 1. The ITO layer was analyzed as in example 1: the pattern in FIG. 3b shows the absence or virtual absence of spots, this being characteristic of an essentially amorphous morphology.

Comparative tests were carried out on the two electrochromic cells.

Firstly, the influence of the morphology of the upper ITO on the variation in a parameter called the "characteristic resistance" as a function of time was studied. This characteristic resistance CR is in fact the inverse of the switching speed when a given voltage is applied to the terminals of the electrodes. It is also possible to determine when the system starts to "age".

The results are shown in FIG. 2: plotted on the x-axis is therefore the time in hours, and the CR is plotted on the y-axis with a scale ranging from 0 to 160. The tests were carried out by cycling the electrochromic cells in a dry oven at 5% relative humidity and at 80° C.

The curve formed by the circles corresponds to comparative example 2 and the curve formed from the diamonds corresponds to example 1 according to the invention: it may be seen that the curve corresponding to example 2 rapidly starts to drift after the first hundred hours of use. In contrast, the curve corresponding to the example according to the invention is remarkably flat up to 2000 hours, and, from 2000 to 4000 hours it tends to increase, but very modestly: this is an exceptional result and proves the importance, hitherto unsuspected, of the morphology of the upper ITO.

Another test was carried out, consisting in measuring the variation in light transmission $\Delta T_L$ in %, under illuminant $D_{65}$) between t=0 and t=30, 500, 1000 and 5000 hours, when the cells are locked in the colored state. The results are given in table 1 below:

TABLE 1

| T (hours | $\Delta T_L$ (example 1) | $\Delta T_L$ (comparative example 2) |
|---|---|---|
| 30 | −2 | −12 |
| 500 | −6 | −15 |
| 1000 | −6 | −16 |
| 5000 | −8 | −17 |

Here again, it may be seen that the example according to the invention is much better, with a $T_L$ drift that remains less than 10% after 5000 hours of use. The drift is also gradual. In contrast, the comparative example has already drifted by more than 10% by 30 hours of use.

These results show the importance of electrochemically stabilizing this upper ITO layer by crystallizing it and densifying it; it is probable that the crystallization of the layer is critical as it organizes the structure of the oxide, making it denser and therefore more stable (the crystallographic cell of the ITO is cubic, with a lattice parameter of 10.226 ångströms).

Useful results are also obtained with upper (possibly also lower) electrodes based on aluminum-doped zinc oxide.

The invention also relates to the substrate provided with at least one electrode of the type described above, independently of the electrical/electrochemical device in which it is incorporated or intended to be incorporated.

The invention claimed is:

1. An electrochemically controllable device having variable optical properties, or variable energy properties, or both variable optical and variable energy properties, comprising:
    at least one carrier substrate provided with an electroactive layer or a stack of electroactive layers placed between a lower electrode and an upper electrode;
    wherein the upper electrode comprises at least one first electronically conductive layer, based on a metal-doped oxide selected from the group consisting of doped indium oxide, doped tin oxide and doped zinc oxide, which is at least partially crystallized in a form of crystallites having a mean size of between 5 and 100 nm.

2. The device as claimed in claim 1, wherein the first electronically conductive layer is predominantly crystallized.

3. The device as claimed in claim 1, wherein the first electronically conductive layer has an electrical resistivity of between $10^{-4}$ and $10^{-2}$ ohm·cm.

4. The device as claimed in claim 1, wherein the first electronically conductive layer has a thickness of between 40 and 400 nm.

5. The device as claimed in claim 1, wherein the first electronically conductive layer is based on indium oxide and contains between 5 and 15% doped metal oxide by weight with respect to indium oxide.

6. The device as claimed in claim 1, wherein the first electronically conductive layer is based on aluminum-doped zinc oxide and contains between 0.5 and 5% by weight of aluminum oxide with respect to zinc oxide.

7. The device as claimed in claim 1, wherein the lower electrode comprises a second electronically conductive layer, based on a metal-doped oxide selected from the group consisting of doped indium oxide, doped tin oxide and doped zinc oxide, which is at least partially crystallized in a form of crystallites having a mean size of between 5 and 100 nm.

8. The device as claimed in claim 7, wherein the second electronically conductive layer includes tin doped indium oxide.

9. The device as claimed in claim 1, wherein the upper electrode comprises, apart from the first electronically conductive layer, at least one other electronically conductive layer and/or a plurality of conducting bands or conducting wires.

10. The device as claimed in claim 1, as an electrochromic system.

11. A glazing panel incorporating the device as claimed in claim 1.

12. A mirror, incorporating the device as claimed in claim 1.

13. The mirror as claimed in claim 12, wherein the mirror includes a rear view mirror.

14. A product selected from the group consisting of glazing panels for buildings, glazing panels equipping internal partitions or windows or roofs or equipping means of transportation of an aircraft, train, automobile, or ship type, display screens, spectacles, lenses, photographic equipment, solar panel protection means, and illuminating surfaces, said product containing the device as claimed in claim 1.

15. A process for obtaining the device as claimed in claim 1, wherein the first electronically conductive layer is deposited by magnetically enhanced sputtering.

16. The process as claimed in claim 15, wherein a pressure in a deposition chamber during deposition is less than 1.2 Pa.

17. The process as claimed in claim 15, wherein said first electronically conductive layer is deposited with ion assistance and/or use of off-equilibrium magnets and/or heating during the deposition.

18. A process for obtaining the device as claimed in claim 1, wherein the electroactive layer or the stack of electroactive layers and the first electronically conductive layer are deposited by sputtering.

19. The device as claimed in claim 1, wherein the at least one first electronically conductive layer is transparent.

20. The device, as claimed in claim 1, wherein the at least one first electronically conductive layer includes tin indium oxide.

21. The device as claimed in claim 1, wherein the crystallites have a mean size of between 10 and 50 nm.

22. The device as claimed in claim 1, wherein the crystallites have a mean size of between 20 and 50 nm.

23. The device as claimed in claim 1, wherein the upper electrode has an electrical resistivity of between $10^{-4}$ and $2 \times 10^{-3}$ ohm·cm.

24. The device as claimed in claim 4, wherein the first electronically conductive layer has a thickness of between 50 and 300 nm.

25. The device as claimed in claim 7, wherein the second electronically conductive layer is transparent.

26. An electrochemically controllable device having variable optical properties, or variable energy properties, or both variable optical and variable energy properties, comprising:
  at least one carrier substrate provided with an electroactive layer or a stack of electroactive layers placed between a lower electrode and an upper electrode;
  wherein the upper electrode comprises at least one first electronically conductive layer based on aluminum-doped zinc oxide and contains between 0.5 and 5% by weight of aluminum oxide with respect to zinc oxide, which is at least partially crystallized in a form of crystallites having a mean size of at least 20 nm.

* * * * *